United States Patent
Pazzaglia

(10) Patent No.: US 10,351,204 B2
(45) Date of Patent: Jul. 16, 2019

(54) VARIABLE-TRIM FRAME FOR TWO-WHEELED VEHICLES

(71) Applicant: MP MECCANICA di Maurizio Pazzaglia, Rastignano (IT)

(72) Inventor: Maurizio Pazzaglia, Pianoro (IT)

(73) Assignee: MP MECCANICA DI MAURIZIO PAZZAGLIA, Rastignano (BO) (IT)

( * ) Notice: Subject to any disclaimer, the term of this patent is extended or adjusted under 35 U.S.C. 154(b) by 175 days.

(21) Appl. No.: 15/639,713

(22) Filed: Jun. 30, 2017

(65) Prior Publication Data

US 2019/0002054 A1 Jan. 3, 2019

(51) Int. Cl.
*B62K 21/02* (2006.01)
*B62K 19/32* (2006.01)
*B62K 21/04* (2006.01)
*B62K 21/22* (2006.01)

(52) U.S. Cl.
CPC .............. *B62K 19/32* (2013.01); *B62K 21/02* (2013.01); *B62K 21/04* (2013.01); *B62K 21/22* (2013.01)

(58) Field of Classification Search
CPC ................................ B62K 19/32; B62K 21/02
See application file for complete search history.

(56) References Cited

U.S. PATENT DOCUMENTS

| | | | | |
|---|---|---|---|---|
| 4,624,470 A * | 11/1986 | Love | ...... | B62K 21/00 180/219 |
| 4,700,963 A * | 10/1987 | Burns | ...... | B62K 21/02 180/219 |
| 5,967,538 A * | 10/1999 | Callaluca | ...... | B62K 21/00 180/219 |
| 7,111,861 B2 * | 9/2006 | Pender | ...... | B62K 19/32 180/219 |
| 7,438,306 B2 * | 10/2008 | Mrdeza | ...... | B62K 21/04 280/274 |
| 8,181,981 B2 * | 5/2012 | Stenberg | ...... | B62K 11/04 180/219 |
| 9,162,726 B2 * | 10/2015 | Takenaka | ...... | B62K 21/10 |
| 2017/0015380 A1 * | 1/2017 | Stothers | ...... | B62K 15/00 |

* cited by examiner

*Primary Examiner* — Tony H Winner
*Assistant Examiner* — Marlon A Arce
(74) *Attorney, Agent, or Firm* — R. Neil Sudol; Henry D. Coleman

(57) ABSTRACT

A variable-trim frame for two-wheeled vehicles has a fork able to connect a handlebar to a hub of a front wheel of the vehicle. A regulating element is provided to rotatably couple the lower portion of the shaft of the handlebar with respective portions of the blades of the fork and destined to make the fork assume a predetermined position in which it is inclined by a relative angle with respect to a perpendicular plane to the ground. A blocking device stabilizes the fork in the predetermined position.

22 Claims, 15 Drawing Sheets

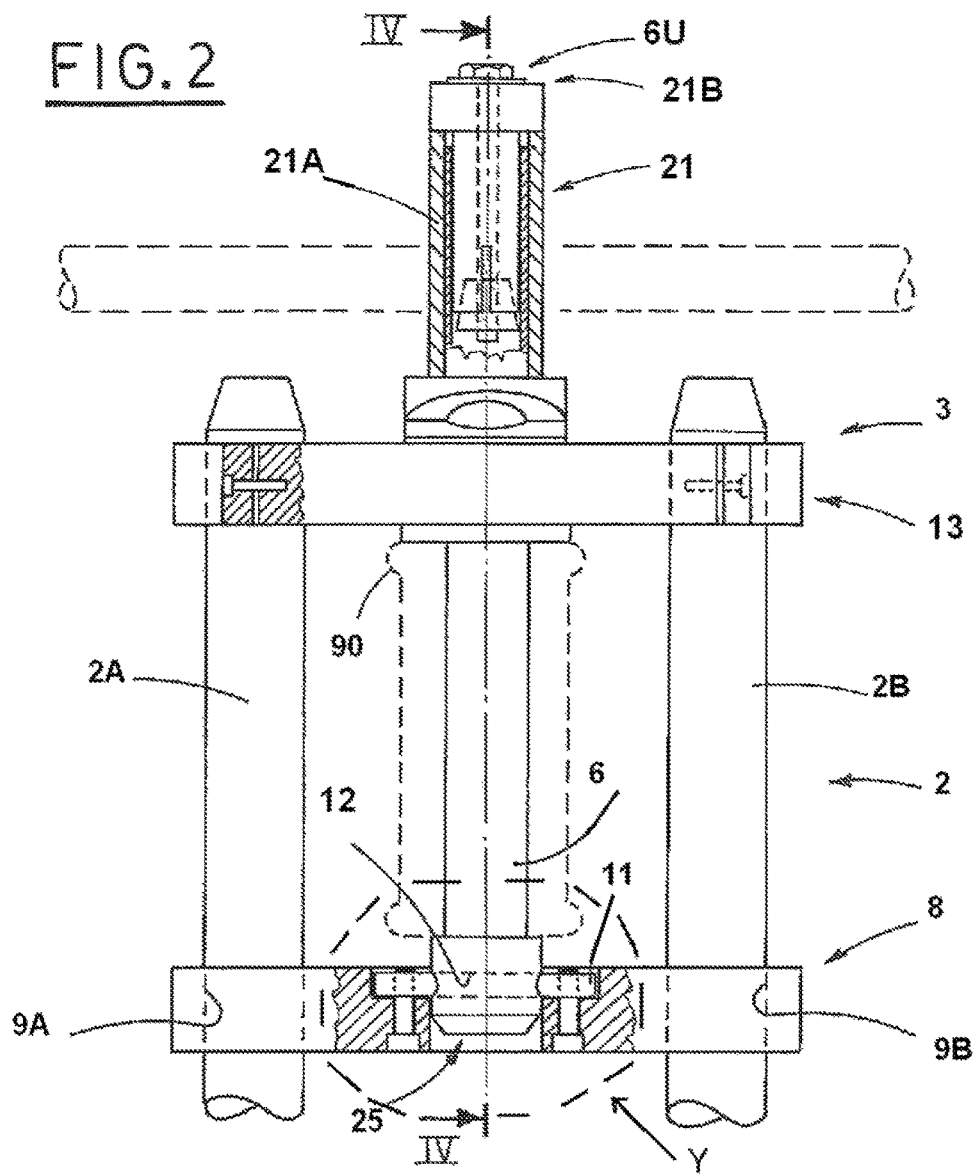
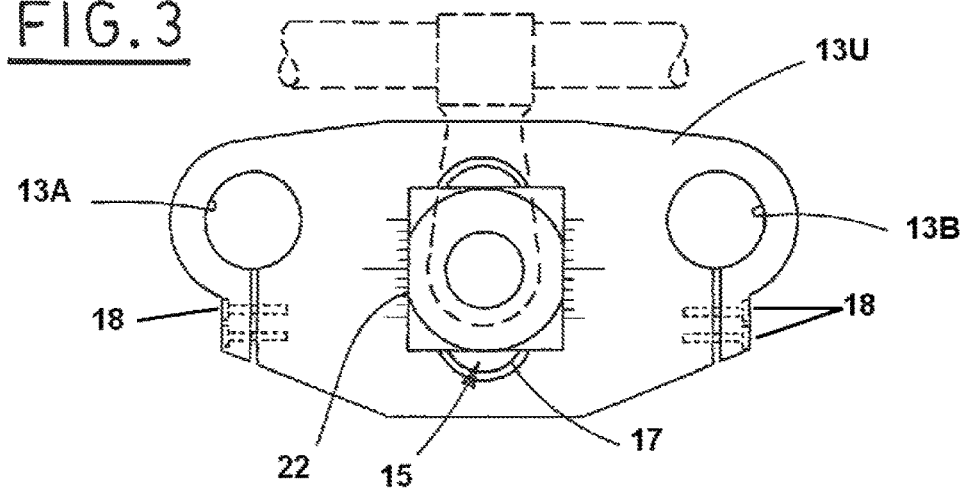

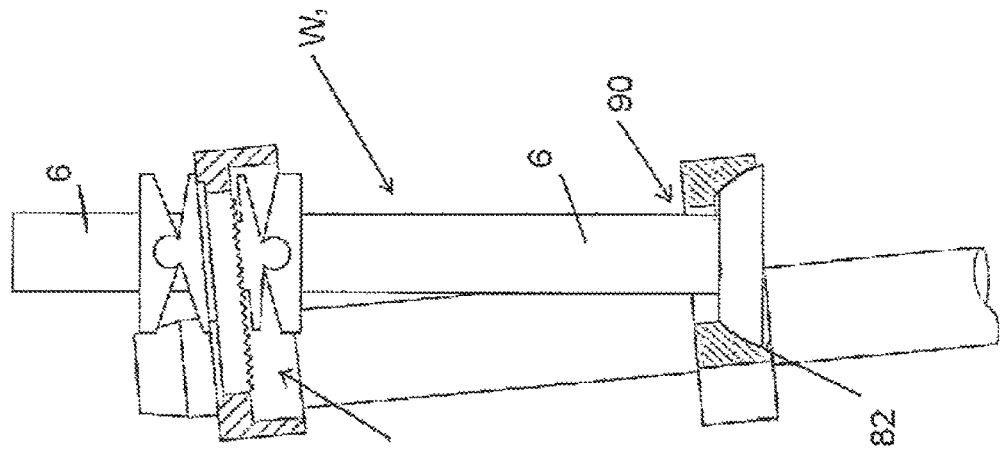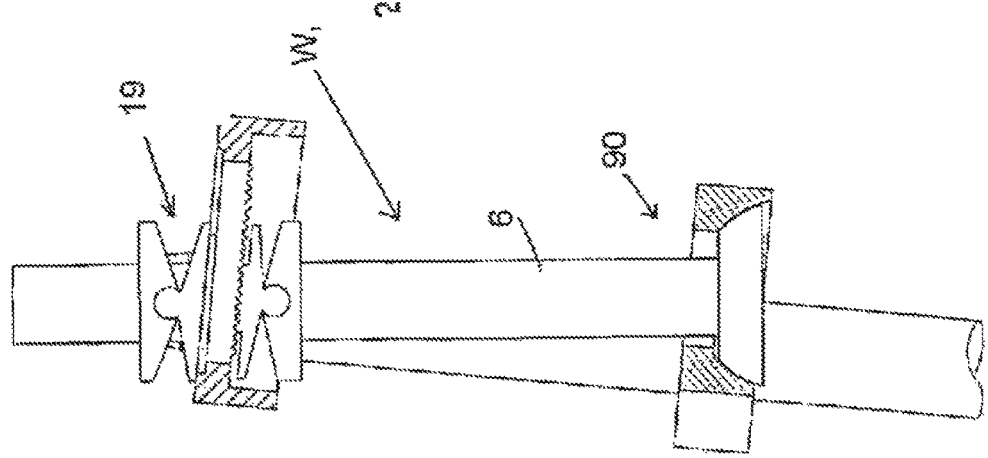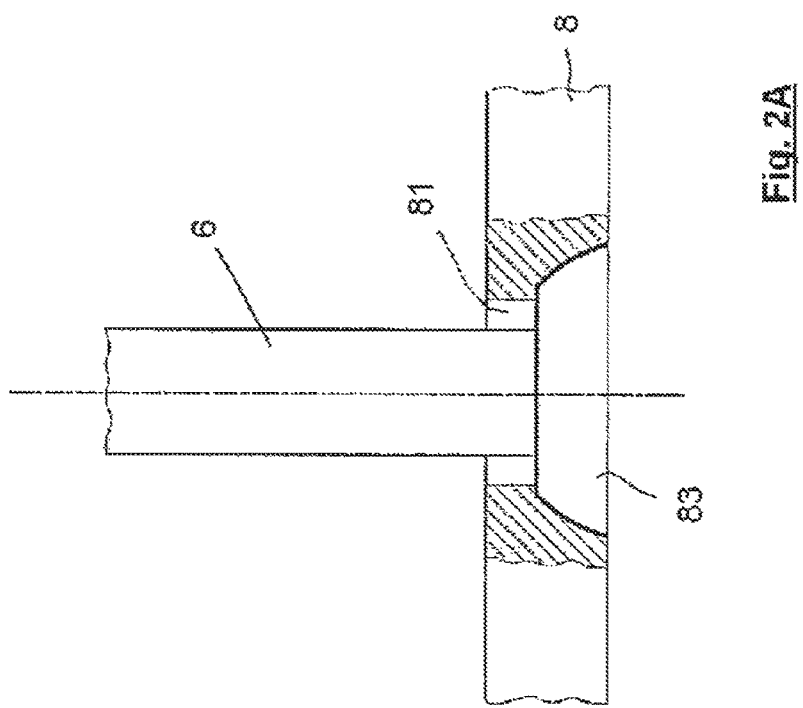

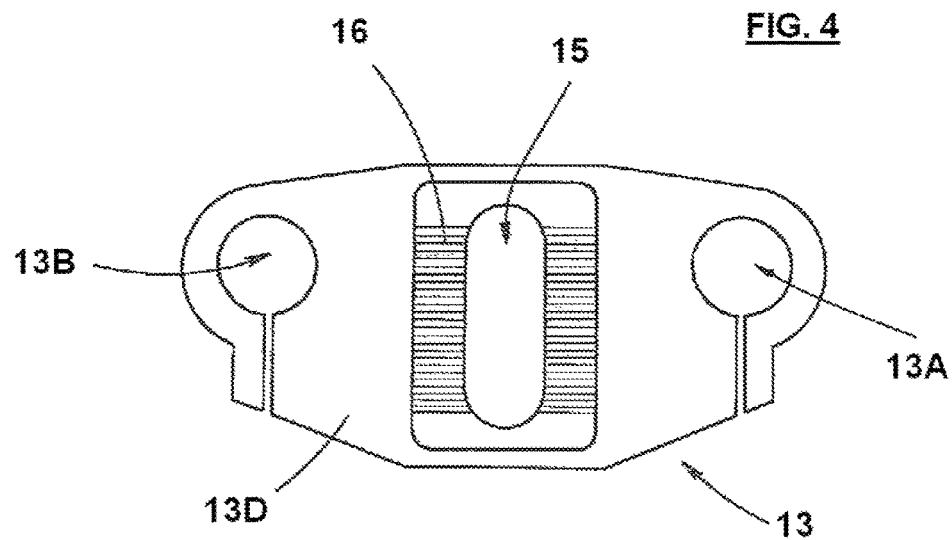
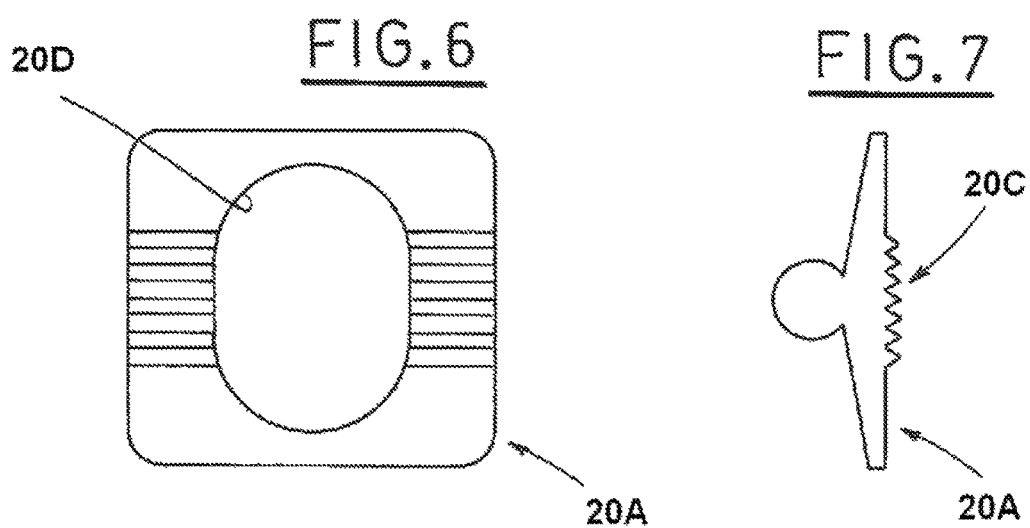
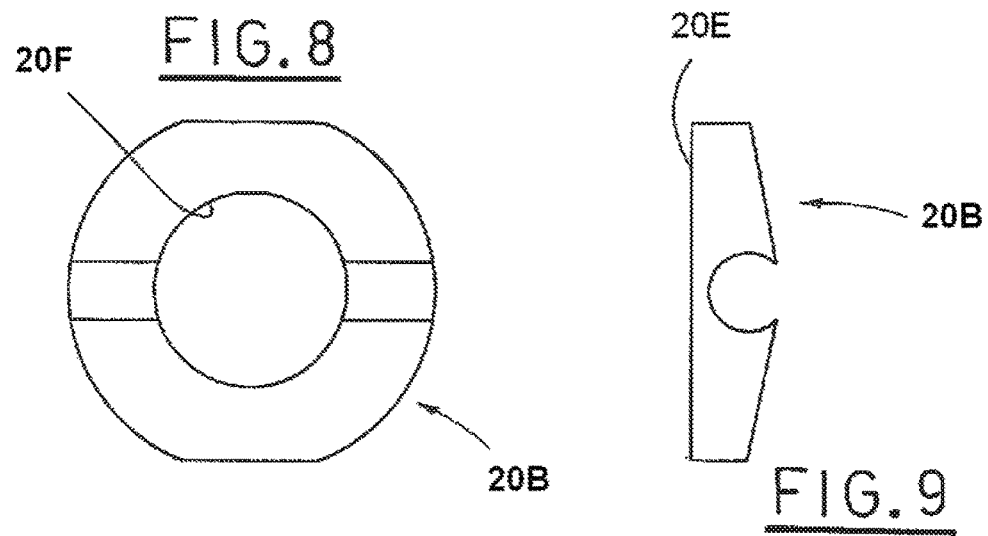

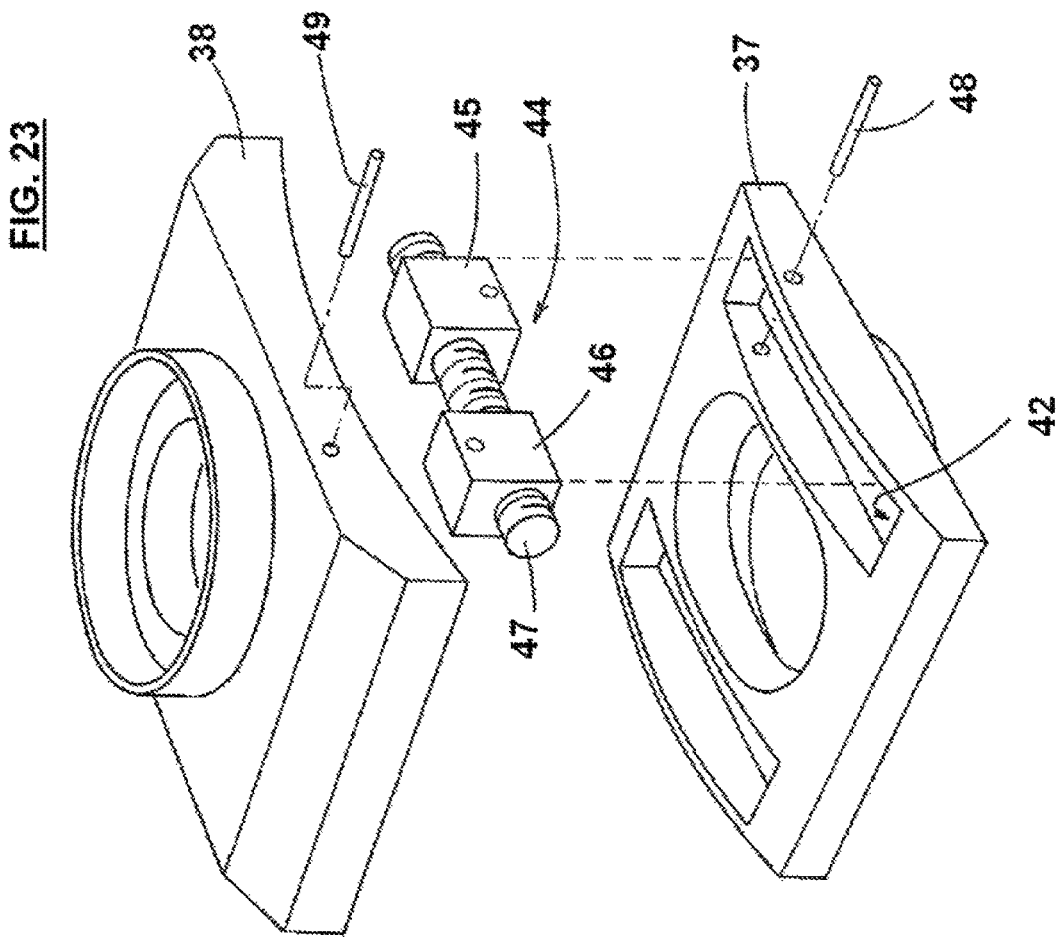
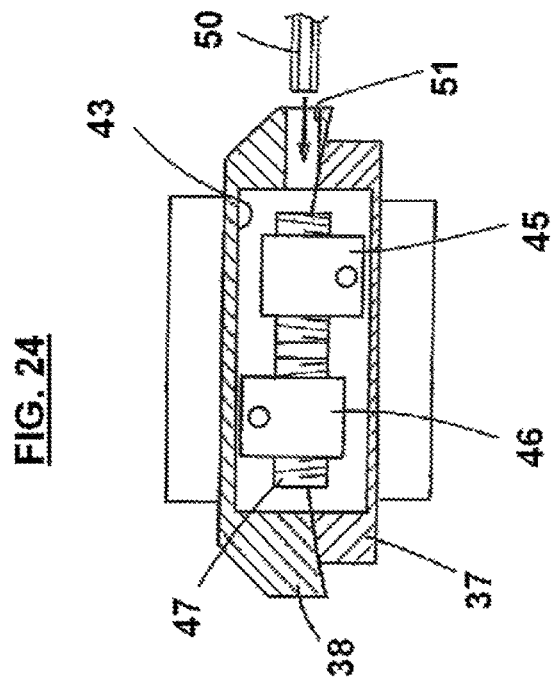

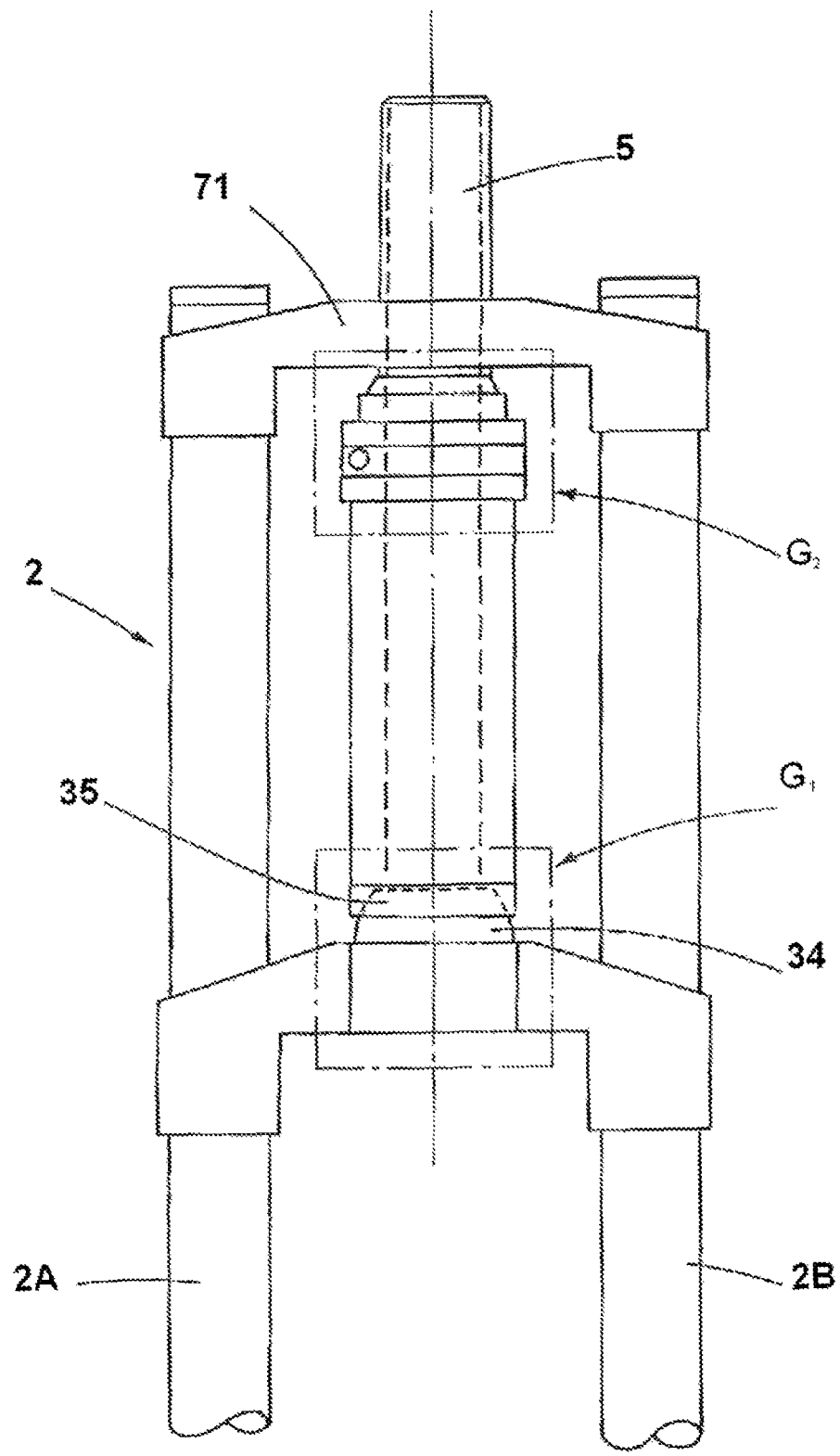

VARIABLE-TRIM FRAME FOR TWO-WHEELED VEHICLES

BACKGROUND OF THE INVENTION

The present invention relates to a variable-trim frame for two-wheeled vehicles, in particular for mountain bikes.

It is known that the inclination of the steering tube of the front wheel of a two-wheeled vehicle significantly influences the stability of the vehicle itself. In particular, in a case where the vehicle, for example a bicycle, is about to begin a sharp downhill run, a greater inclination of the axis, as denoted by reference numeral $\phi_2$ in FIG. 1B, enables better control of the means, reducing the risk of tipping over during a steering and braking step. Vice versa, during movement on a flat terrain, an accentuated inclination of the above-mentioned axis is disadvantageous, because it forces the user into a less comfortable position, and makes use of the handlebar more troublesome, as a trim with a less inclined axis is advantageous, as denoted by reference numeral $\phi_1$ in FIG. 1A.

Therefore, the market has a need for a frame for two-wheeled vehicles which enables a user to simply and rapidly vary the angle of inclination of the steering tube of the front wheel to suit the features of the trajectory to be undertaken. In particular, this need is felt in a case of bicycles of the mountain bike type, often used for arduous routes where there are frequent changes of inclination.

SUMMARY OF THE INVENTION

The aim of the present invention is to obviate the above-mentioned drawback, by providing a variable-trim frame which enables a user to simply and rapidly vary the angle of inclination of the steering tube of the front wheel.

In the light of the above aim, a further aim of the present invention is to make available a variable-trim frame of simple conception, with surely reliable function and versatile use, long-lasting and simple to maintain.

In accordance with claim 1, a variable-trim frame is described for two-wheeled vehicles, comprising: a fork able to connect a handlebar to a hub of a front wheel of the vehicle; regulating means able to rotatably couple the lower portion of the shaft of the handlebar with respective portions of the blades of the fork and destined to make the fork assume a predetermined position in which it is inclined by a relative angle with respect to a perpendicular plane to the ground; blocking means able to stabilise the fork in the predetermined position.

In accordance with claim 12, a frame is described for a two-wheeled vehicle having a variable trim, comprising: a fork able to connect a handlebar to the hub of the front wheel, having an upper shaft connected to the handlebar, and two parallel blades able to accommodate the hub at the respective lower ends thereof; a tubular sleeve, in which the shaft can be housed, passing axially with a variable inclination; a first spherical joint hinge, arranged at the lower end of the sleeve and enabling the shaft to oscillate in a longitudinal plane and at the same time to rotate about a fulcrum point; means associated to the upper end of the tubular sleeve for regulating the angle of inclination of the blade with respect to the sleeve.

BRIEF DESCRIPTION OF THE DRAWINGS

The characteristics of the invention are specified in the following with reference to the accompanying tables of drawings, wherein:

FIG. 2 is a schematic perspective view in larger-scale with respect to the preceding figures, a rear view of the frame with some parts removed in order to better highlight others;

FIG. 2A is a variant of detail Y of FIG. 2, with some parts sectioned and/or removed better to evidence others;

FIGS. 2B, 2C illustrate two positions of the shaft of FIG. 2A;

FIG. 3 is a view from above of a component of the fork;

FIG. 4 is a view from below, looking up, of the component of FIG. 3;

FIGS. 6, 7 schematically illustrate, in a larger scale with respect to the preceding figures, respective views from below and from the side of a component of the fork, an integral part of the frame;

FIGS. 8, 9 illustrate, in the same scale of FIGS. 6, 7, views from below and from the side of a component of the fork;

FIG. 23 is an exploded view of a hinge device for regulating the inclination of the axis of the frame according to the above-mentioned variant;

FIG. 24 is a lateral section view of the hinge;

FIG. 32 is a front view of a detail of the fork of the frame that is alternative to what is illustrated in FIG. 21.

DESCRIPTION OF THE PREFERRED EMBODIMENTS

Figure 1A:
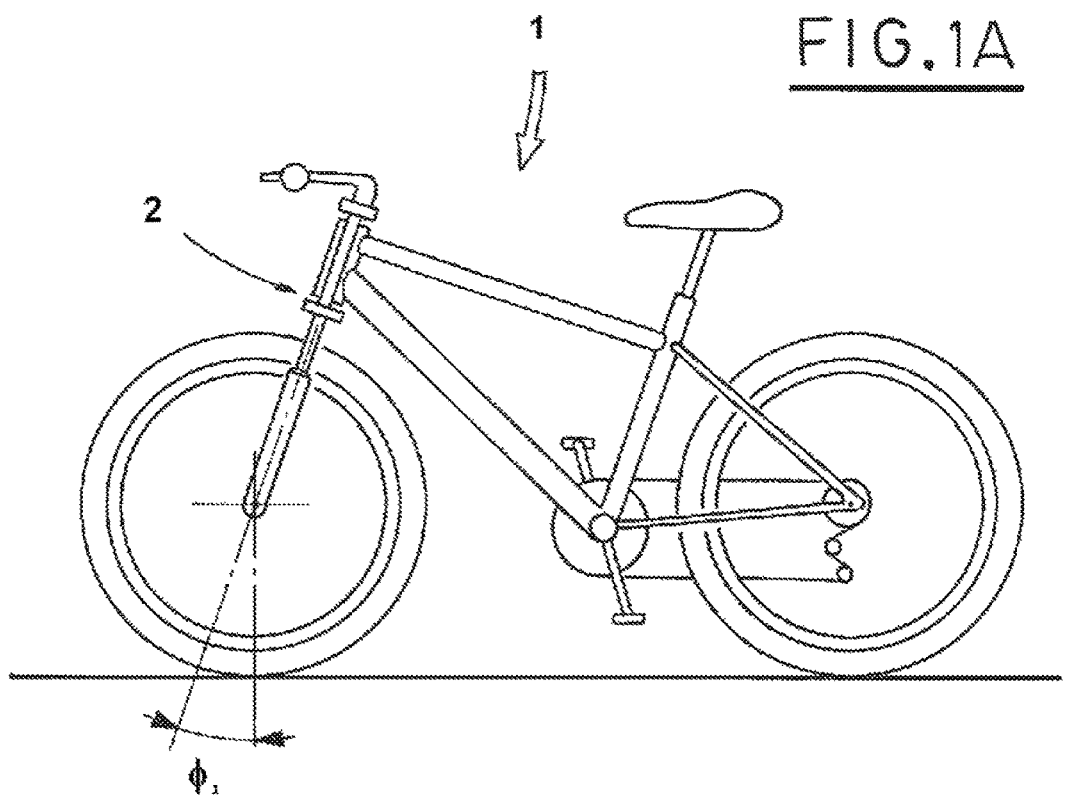
FIGS. 1A, 1B schematically illustrate lateral views of a mountain bike comprising a frame respectively configured in a first and a second operating position in which the steering tube of the front wheel is inclined with respect to the vertical of the angles $\phi_1$, $\phi_2$.
Figure 1B:
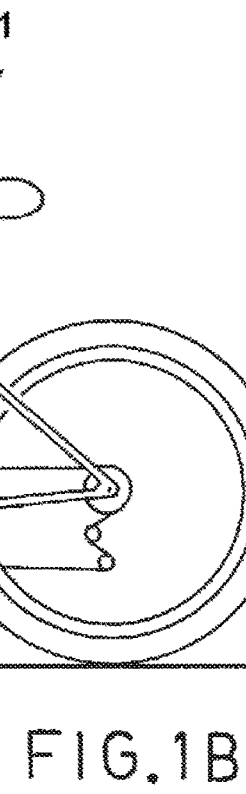
Figure 5C:
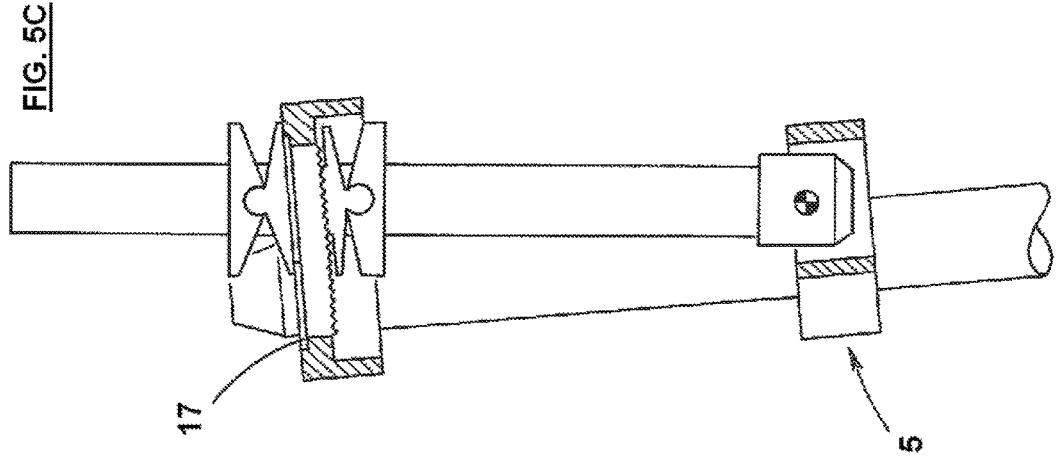
FIGS. 5A, 5B, 5C schematically illustrate three lateral and partially-sectioned views of the upper portion of the frame in corresponding operating positions.
Figure 5B:
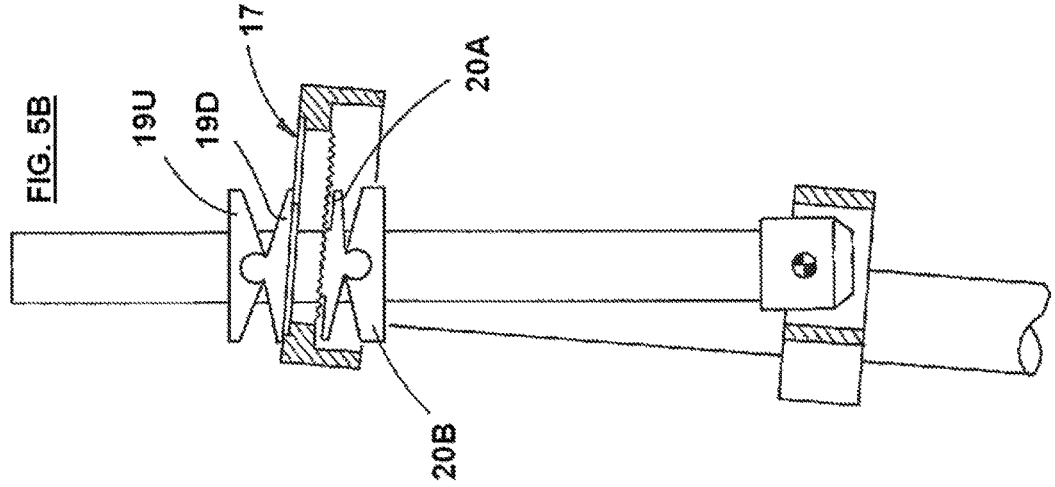
Figure 5A:
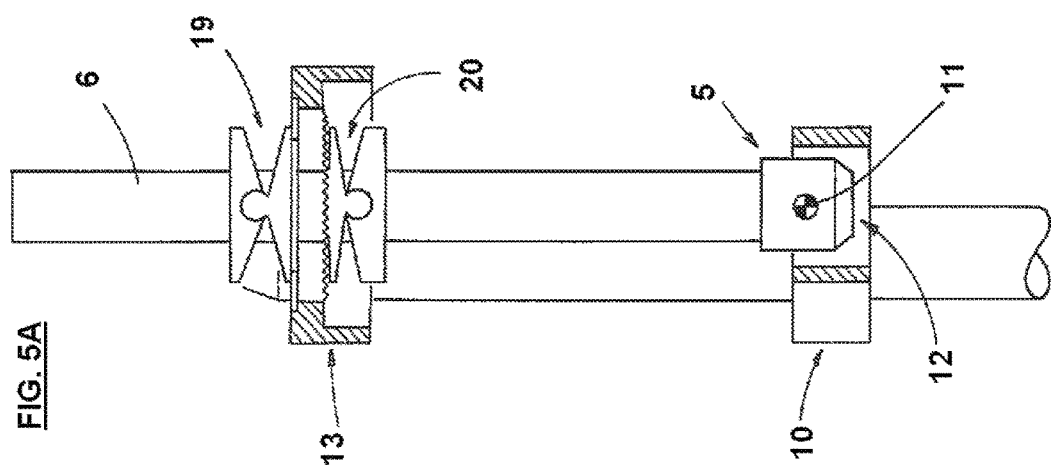
Figure 11:
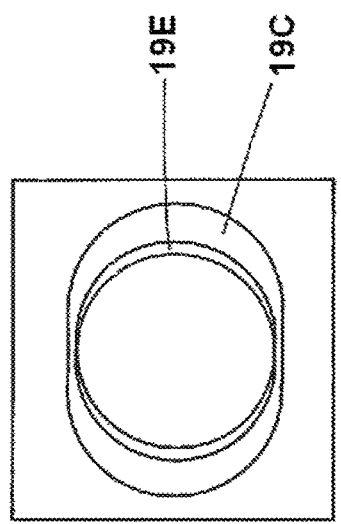
FIGS. 10, 11 illustrate views, from the side and from below, of a further component of the fork.
Figure 10:
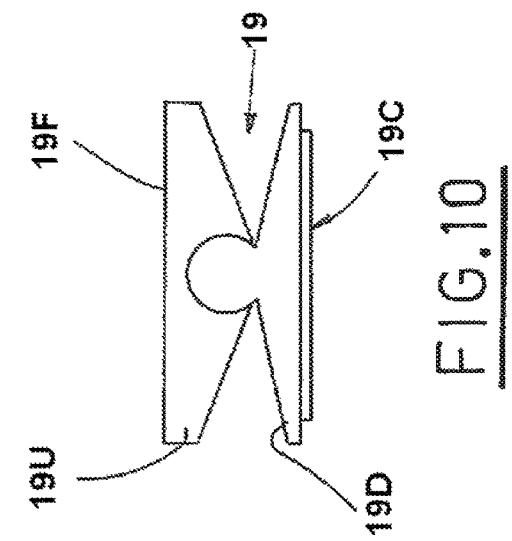

With reference to FIGS. 1A, 1B an 2, reference numeral 1 denotes a two-wheeled vehicle, for example a mountain bike, equipped with the frame of the invention. The frame is provided with a fork 2 which comprises regulating means 5 able to rotatably couple the lower portion of the shaft 6 of the steering of the mountain bike with respective portions of the blades 2A, 2B of the fork and destined to make the fork 2 assume a predetermined position in which it is inclined by a relative angle ($\phi_1$, $\phi_2$) with respect to a perpendicular plane to the ground.

Blocking means are provided, of which more in the following, able to stabilise the fork in the predetermined position as mentioned above.

With reference to FIG. 2, the regulating means 5 comprise a lower plate 8 having two holes (respectively a left hole 9A and a right hole 9B) crossed by the respective blades 2A, 2B.

First clamping means (of known type and not illustrated), at the holes 9A, 98, block the lower plate 11 to the blades 2A, 2B.

The central portion of the lower plate 8 comprises a hole 25 which is freely and partially involved by the lower end of the shaft.

A pin 11 fixed in a known way to the walls delimiting the hole 25, is positioned perpendicularly to the shaft 6 of the steering, and freely couples with a first transversal through-hole 12, fashioned in proximity of the lower end of the shaft.

In the variant embodiment of FIG. 2A, the central part of the lower plate 8 comprises a through-hole 81 the surface of which extends in a spherical portion 82 with a growing diameter, proceeding in a top-downwards direction.

The shaft 6 terminates inferiorly with a head 83 peripherally delimited by a spherical profiled portion complementary to the spherical portion 82 of the hole 81.

In use conditions of the fork, the head is coupled to the spherical portion 82: in this way a spherical node 90 is constituted which enables the shaft 4 to oscillate with respect to the plate: see two possible positions $W_1$ and $W_2$ of the axis of the shaft, indicated in FIGS. 2B and 2C.

The blocking means, with reference to FIGS. 2, 2A, 3, 4, 5A, 5B, 5C, comprise an upper plate 13 having, in proximity of the lateral ends thereof, two holes (left 14A and right 14B) crossed by the upper ends of the blades, 2A, 2B, of the fork 2.

The central portion of the shaft 19 freely crosses a slot 15 realised in the central portion of the upper plate 13.

The upper plate 13 comprises, in the lower face 13D thereof, a cogging 16, interrupted by the slot 15, the cogs of which are perpendicular to the axes of the holes 13A and 136. The upper plate 13 further comprises, at the upper face 13U thereof, an undercut 17 partially contacting the border of the slot 15 (FIGS. 3, 4).

The holes 13A and 13B, included in upper plate 13, are coaxial to the respective holes 11A and 11B, realised in the lower plate 8.

Further included are second clamping means 18, of known type, for blocking the upper plate 13 to the blades 2A. 28 at the holes 13A, 13B.

Upper blocking means 19 and lower blocking means 20 are included, associated to corresponding portions of the shaft 6; these means are respectively overlying and underlying the upper plate 13 and are able to block the upper plate 13.

The upper blocking means 19, with reference to FIGS. 5A, 5B, 5C, 10 and 11, comprise a lower block 19D and an upper block 19U hinged to one another according to an axis that is perpendicular to the axis of the shaft 6.

The lower block 19D inferiorly comprises a prominence 19C slidably coupled to the undercut 17 of the upper plate 13. A first oval through-hole 19E, realised centrally in the lower block 19D, is crossed by the shaft 6.

The upper block 19U has a flat upper face 19F; a first circular through-hole 19G crossed by the shaft 6 is fashioned centrally in the upper block 19U.

Clamping means 21 are externally associated to the upper terminal portion of the shaft 6, and axially press, from the top-downwards, the upper blocking means 19 against the upper face 13U of the upper plate 13. The clamping members are constituted, for example, by a hollow cylindrical body 21A on the upper terminal portion of which a locking bolt 21B locks down the steering of the mountain bike. The lower terminal portion of the hollow cylindrical body 21A is in contact with the upper surface 19F of the upper block 19U.

The lower blocking members comprise a gripping block 20A and a stabilising block 20B, positioned inferiorly of the gripping block 20A, hinged to one another according to a perpendicular axis to the axis of the shaft 6.

A cogging 20C is provided on a portion of the upper face of the gripping block 20A; this cogging couples with the cogged surface 16 fashioned on the upper plate 13 (FIGS. 5A, 5B, 5C, 7). A second oval through-hole 20D, realised centrally in the gripping block 20A, is crossed by the shaft 6.

The stabilising block 20B has a flat lower face 20E and centrally affords a second circular through-hole 20F crossed by the shaft 6.

It is stressed that the sleeve 23 of the frame 24 receiving the central portion of the shaft 6 identifies, with the upper part thereof, the abutment means which prevent axial movements of the lower blocking means 20.

A graduated scale 22 is advantageously included on the face 13U facing upwards of the upper plate 13 so as to provide the user with an indication of the inclination of the fork 2 (FIG. 3).

The operating modes of the fork 2 of the invention, in both the above-considered embodiments, will now be described.

If for example the angle of incidence of the fork 2 of the mountain bike is equal to $\phi_1$, in order to change the inclination of the fork 2 with respect to the ground the user first unblocks the upper blocking members 19. It is sufficient to unscrew the screw of the bolt 21B blocking the steering: this enables raising the cylindrical body 21 with a consequent disengagement of the lower portion thereof from the upper surface 19F of the upper block 19U.

Thereafter the user unblocks the lower blocking means 20.

By removing the second clamping means 18 to unblock the upper plate 13 from the blades 2A, 2B: the group defined by the upper plate 13, the upper blocking means 19 and the sleeve 23 can then be translated upwards to disengage the cogged surface 16 from the cogging 15C of the gripping block 20A.

The above-described operations enable the user to manually intervene to oscillate the fork 2 (and more precisely the group defined by the upper plate 13 and lower plate 10 and the blades 2A, 2B of the fork 2) about the axis of the plug 11, or about the spherical hinge 90 (FIGS. 2A, 2B 2C), for varying the angular positioning of the group with respect to the ground. Consequently the user can position the fork 2 so as to be inclined by a predetermined angle (for example $\phi_2$, as indicated in FIG. 1B), with respect to a plane that is perpendicular to the ground.

It is stressed that the angular travel of the fork 2 is limited by the abutment of the prominence 19C against the rounded terminal portions of the undercut 17 conformed by the slot 15.

To block the fork in the position desired by the user it is necessary to carry out operations that are inverse to those described in the foregoing. The action of the clamping members 21 and the reciprocal engagement of the cogs conformed by the cogging 20C with the cogs of the cogged surface 16 of the upper plate 13 enable an effective blocking of the fork 2 in the desired position.

Having completed the clamping of all the blocking means as described above, the upper blocks 19U and the stabilising blocks 20B are perpendicular to the shaft 6; the lower blocks 19D and the gripping blocks 20A are inclined as a function of the inclination of the fork 2.

Figure 13:
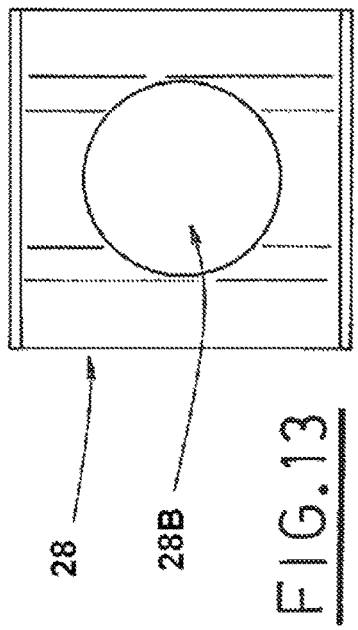
FIGS. 13, 14 are views, from below and frontal, respectively of the upper element and the lower element of the component illustrated in FIG. 12.
Figure 12:
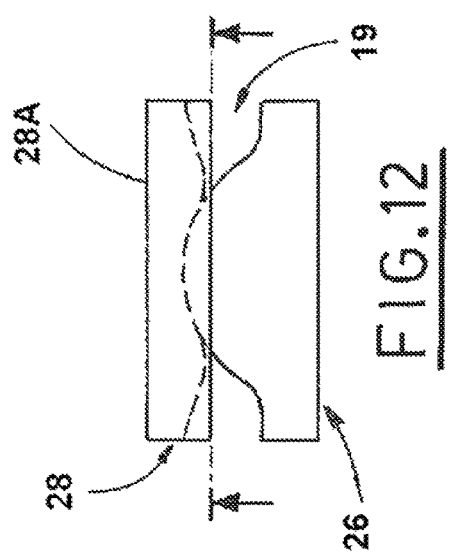
FIG. 12 is a lateral view of a variant of the component of FIGS. 10, 11.
Figure 14:
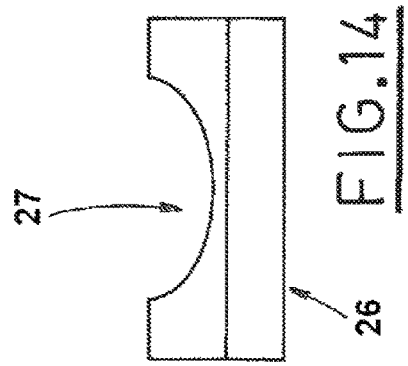

An alternative embodiment of the upper blocking means 19 is illustrated in FIGS. 12, 13, 14, which upper blocking means 19 comprise: a lower block 26 (FIG. 14), centrally having an oval through-hole 27 crossed by the shaft 6; an upper block 28 (FIG. 13), the upper face 28A of which is flat, centrally having a relative circular through-hole 28B crossed by the shaft 6. The lower block 26 has, at the sides of the upper portion thereof, a pair of semi-circular prominences able to couple with corresponding profiled portions (profiled complementarily to the prominences) fashioned on the lower portion of the upper block 28: in this way the blocks 26, 28 are hinged to one another.

Figure 16:
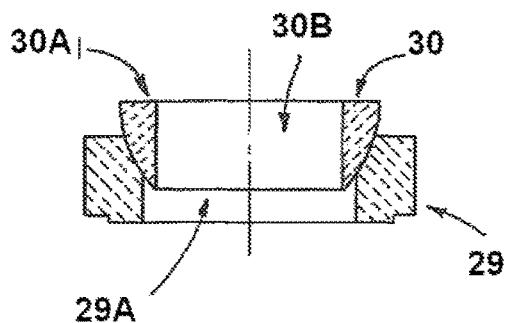
FIGS. 16, 17 are two views along sections XVI-XVI and XVII-XVII of FIG. 15.
Figure 15:
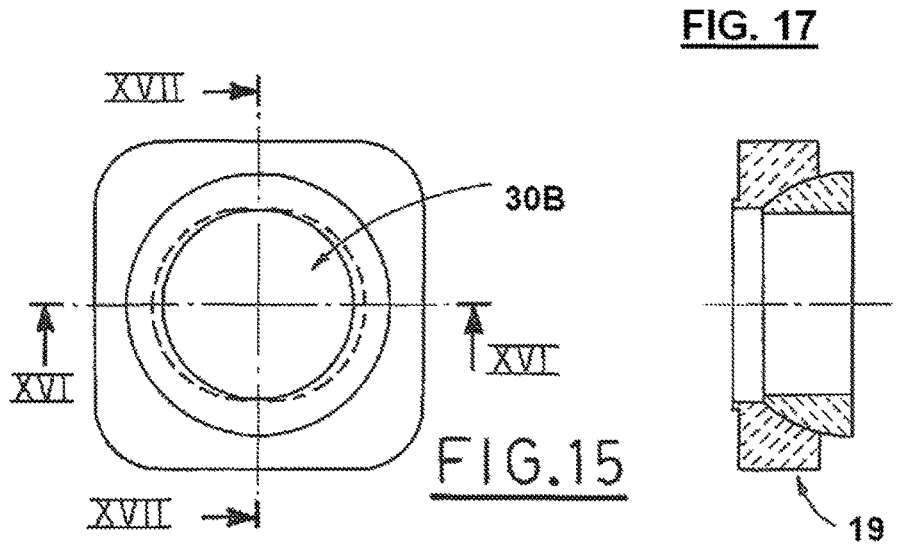
FIG. 15 is a plan view of a variant of the component illustrated in FIGS. 10, 11.
Figure 17:
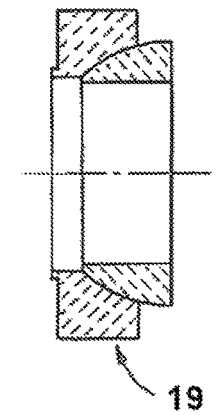

A further embodiment of the upper blocking means 19 is illustrated in FIGS. 15, 16, 17, which upper blocking means 19 comprise a lower block 29 (in which an oval through-hole 29A crossed by the shaft 6 is afforded), hinged, by means of a spherical coupling, to an upper block 30.

The upper block 30 is located above the lower block 29, has a flat upper face 30A and centrally affords a first circular through-hole 30B crossed by the shaft 6.

Figure 18:
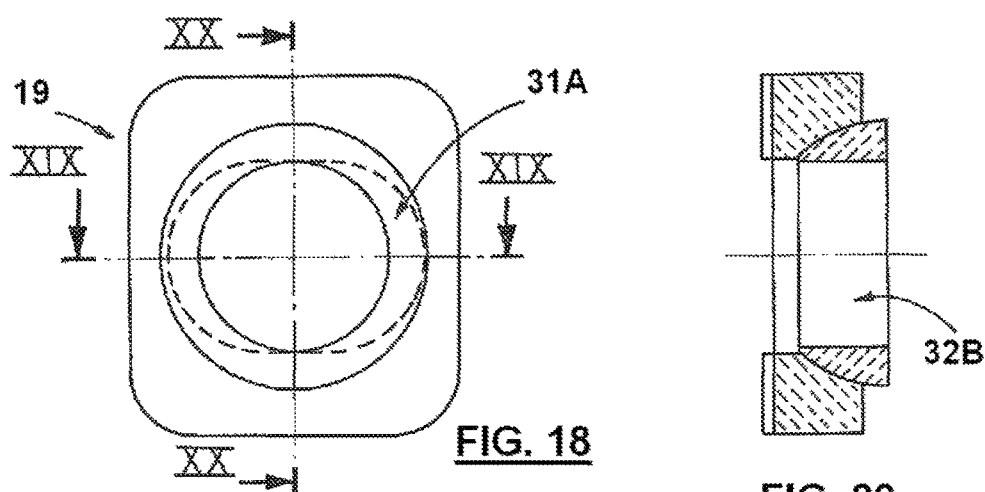
FIG. 18 is a plan view of a further variant of the component illustrated in FIGS. 7 and 9.
Figure 20:
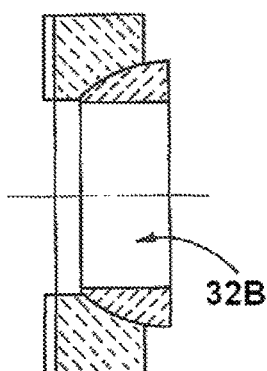
FIGS. 19, 20 are two views along sections XIX-XIX and XX-XX of FIG. 18.
Figure 19:
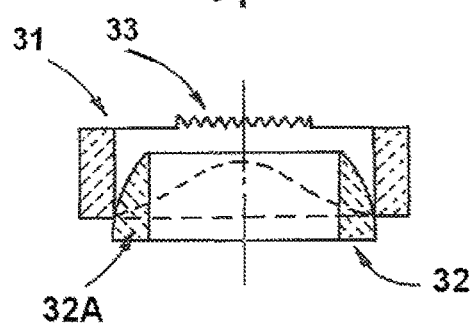
Figure 21:
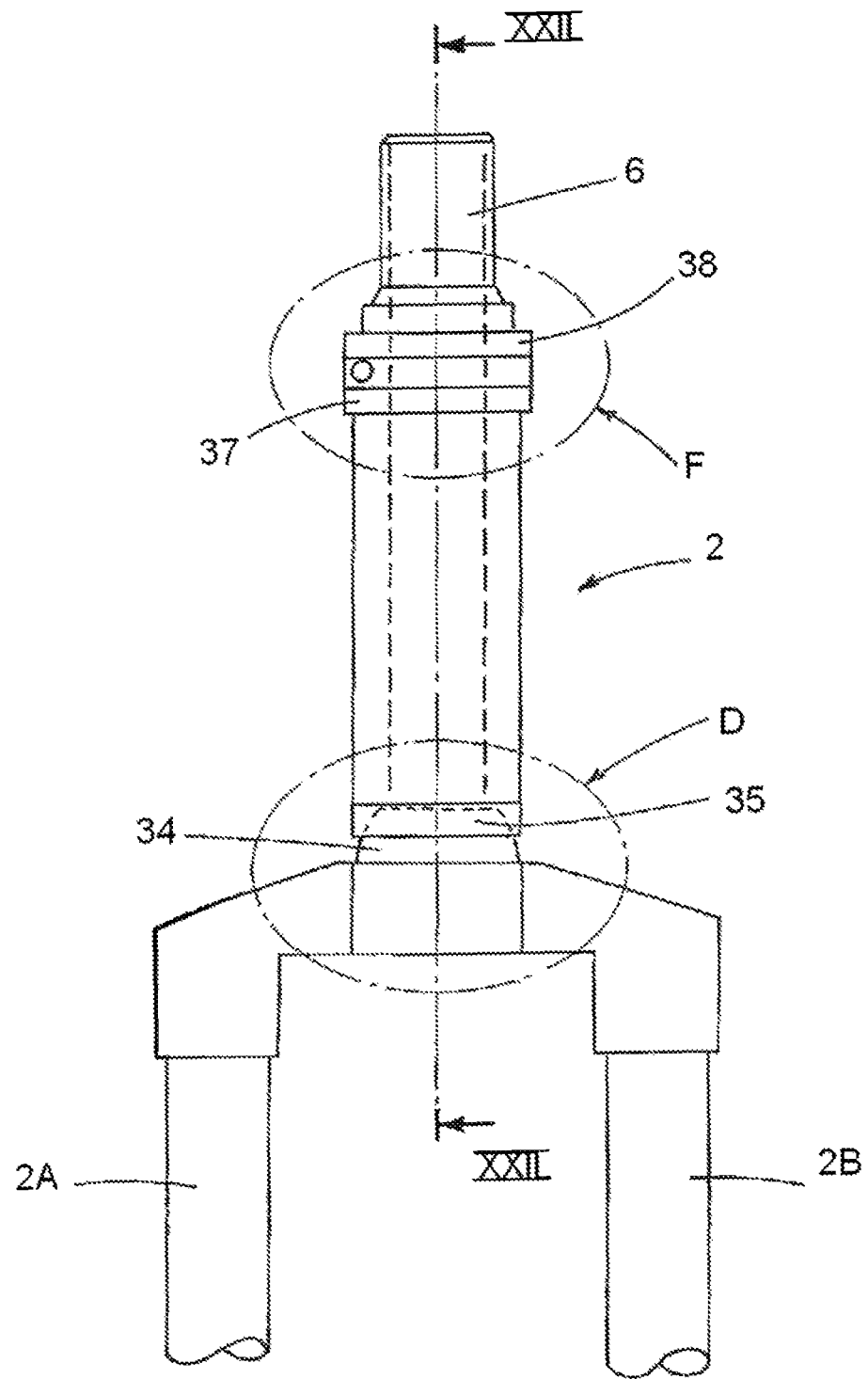
FIG. 21 is a front view of a detail of the variable-trim frame in a further embodiment thereof.

FIGS. 18, 19, 20 instead illustrate an alternative embodiment of the lower blocking means 20. The means comprise: a gripping block 31, in which an oval through-hole 31A is afforded centrally, crossed by the shaft 6, coupled by a spherical coupling, with the gripping block 31. The stabilising block 32, located below the block 30, has a flat lower face 32A and centrally has a circular through-hole 32B crossed by the shaft 6.

A cogging 33, conformed on at least a portion of the upper face of the gripping block 31, couples with the cogged surface 16 fashioned on the upper plate 13.

It is clear that the variable-trim frame for two-wheeled vehicles, in particular for mountain bikes, enables regulating the angle of incidence of the fork with respect to the ground as a function of the inclination of the ground: it follows that the user can undertake slopes of various inclinations, without the stability of the mountain bike being diminished.

It is then possible for the user to easily and effectively manoeuvre the mountain bike on slopes having various inclinations.

High standards of reliability are also ensured in any use condition.

It is clear that by appropriately sizing the above-described components, it is also possible to use the variable-trim frame on other two-wheeled vehicles, such as, for example, mopeds and/or motorcycles.

With reference to the variant embodiment of FIGS. 21-32, the shaft 6 of the steering is connected to the blades 2A, 2B of the fork 2 by means of a substantially-hemispherical cap 34, as will be more precisely defined in the following.

The shaft 6 is coaxially inserted in the tubular sleeve 23, which has a bushing 35 at the lower end thereof. The bushing 35 internally has an annular spherical profiled portion, with a degree of curvature corresponding to that of the cap 34, so as to couple therewith to define a first spherical joint hinge 36 which enables the shaft 6 to rotate about the longitudinal axis thereof, and at the same time to rotate about the fulcrum X of the spherical joint.

The tubular sleeve 23 bears at an upper end thereof a second cap 37, axially exhibiting a through-hole through which the upper part of the shaft 6 is inserted. The cap 37 has a surface, substantially hemispherically shaped, which couples with a complementary lower surface of a second bushing 38, to constitute a second spherical joint hinge 39. In particular, the opposite spherical surfaces of the cap 37 and of the bushing 38 have a centre of curvature coinciding with the fulcrum X of the first spherical joint hinge 36.

The shaft 6 axially exhibits an abutment 40, borne by a rotatable support means 41, positioned in a seating realised superiorly in the bushing 38; the support means 41 absorbs the axial loads of the shaft 6.

The cap 37 superiorly exhibits a groove 42, arranged at a groove 43 fashioned inferiorly in the bushing 38 (see in particular FIGS. 23 and 24). The facing grooves 42 and 43 identify a seating in which a regulating means 44 is housed, comprising a first fixed block 45, with a threaded through-hole, a second fixed block 46, with a threaded through-hole, and a threaded pin 47 having two threadings in series, oppositely directed. The pin 47 engages the threaded through-holes of the blocks 45 and 46. The first fixed block 45 is blocked in the seating of the groove 42 by means of a transversal blocking pin 48. The second fixed block 46 is blocked in the seating of the groove 43 by means of a further transversal blocking pin 49.

The threaded pin 47 is axially contacted at an end thereof by a profiled hole which is engaged by an hexagonal key 50, for rotation thereof. The profiled hole for regulating is accessible via a through-hole 51 realised laterally in the bushing 38 (see FIG. 24).

The functioning of the variable-trim frame for two-wheeled vehicles of this embodiment is described in the following.

When it is necessary to modify the angle of inclination of the steering tube of the front wheel, the cyclist inserts the special regulating tool, for example the hexagonal key 50, in the hole 51, and activates the threaded pin 47 in rotation by means thereof. The pin 47 has at ends thereof two opposite threadings (see FIG. 24) and consequently the rotation thereof causes a relative distancing or nearing of the blocks 45 and 46, according to the direction in which the rotation is exerted. The relative distancing of the blocks 45 and 46 causes the displacement of the bushing 38 towards the front part of the bicycle; this causes the oscillation of the shaft 6 with respect to the fulcrum X, and therefore the reduction of the angle of inclination of the steering tube of the front wheel (see FIG. 22B). Likewise, the relative nearing of the blocks causes the displacement of the bushing 38 towards the rear part of the bicycle; this causes the oscillation of the shaft 6 with respect to the fulcrum X, and therefore the increasing of the angle of inclination of the steering tube of the front wheel (see FIG. 22C).

In a different embodiment of what is illustrated in FIGS. 23, 24, the cap 37 superiorly comprises the groove 42, open on the side of the cap facing the rear part of the bicycle. The groove 42 couples with a groove 43 realised on the facing lower surface of the bushing 38. The grooves 42 and 43 are engaged by a regulating means 44 comprising a first fixed block 45, with a threaded through-hole, a second fixed block 46 having a threaded through-hole, and a regulating screw 47. The screw engages the threaded through-holes of the blocks 45 and 46. The first fixed block is blocked in the groove 42 (FIG. 25) by means of a transversal blocking pin 48. The second fixed block is blocked in the seating of the groove 43 by means of a transversal blocking pin 49. The regulating screw exits laterally from the hinge 39 and at the free end has a knob 52 for facilitating grip and manoeuvring thereof.

To vary the angle of inclination of the steering tube of the front wheel, the user rotates the regulating knob 52; this sets the screw 47 in rotation (see FIG. 23) which has two opposite threadings, able to respectively engage the first block 45 and the second block 46; the rotation of the screw 47 causes the relative distancing or nearing of the blocks 45 and 46, according to the rotation direction. The relative distancing of the blocks causes the displacement of the bushing 38 towards the front part of the bicycle; this causes the oscillation of the shaft 6 with respect to the fulcrum X, and therefore the reduction of the angle of inclination of the steering tube of the front wheel. The relative nearing of the blocks 45 and 46 brings about the increase of the angle of inclination of the steering tube of the front wheel.

Figure 26:
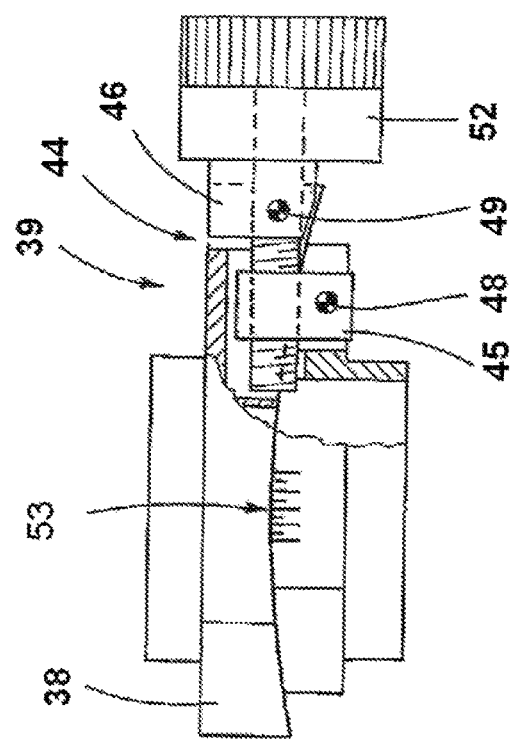
FIGS. 25 and 26 are respectively an axonometric view and a lateral view in partial section of a different embodiment of the above-mentioned hinge device for regulating the inclination of the axis of the frame.
Figure 25:
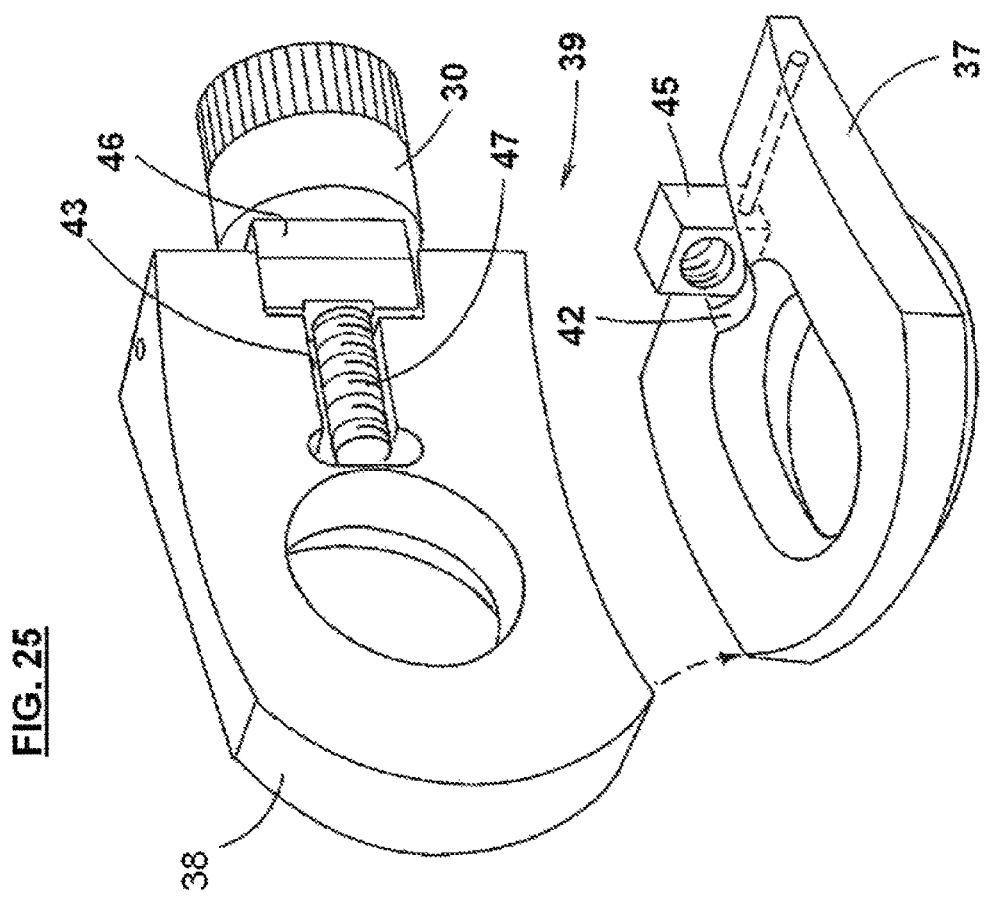

The inclination of the steering tube of the front wheel is visualised by means of a graduated scale 53, associated to a fixed index, engraved respectively on the cap 37 and on the bushing 38: see FIG. 26.

Figure 31:
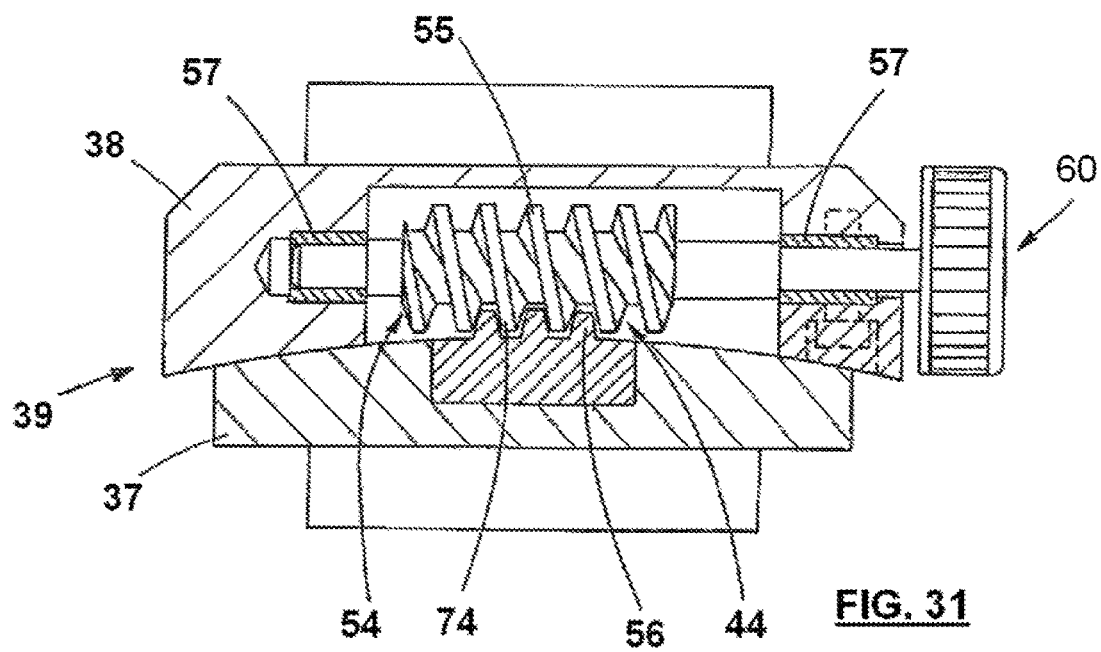
FIGS. 30 and 31 are respectively a partly-sectioned plan view and a lateral view in section of a further constructional variant of the frame of the invention.
Figure 30:
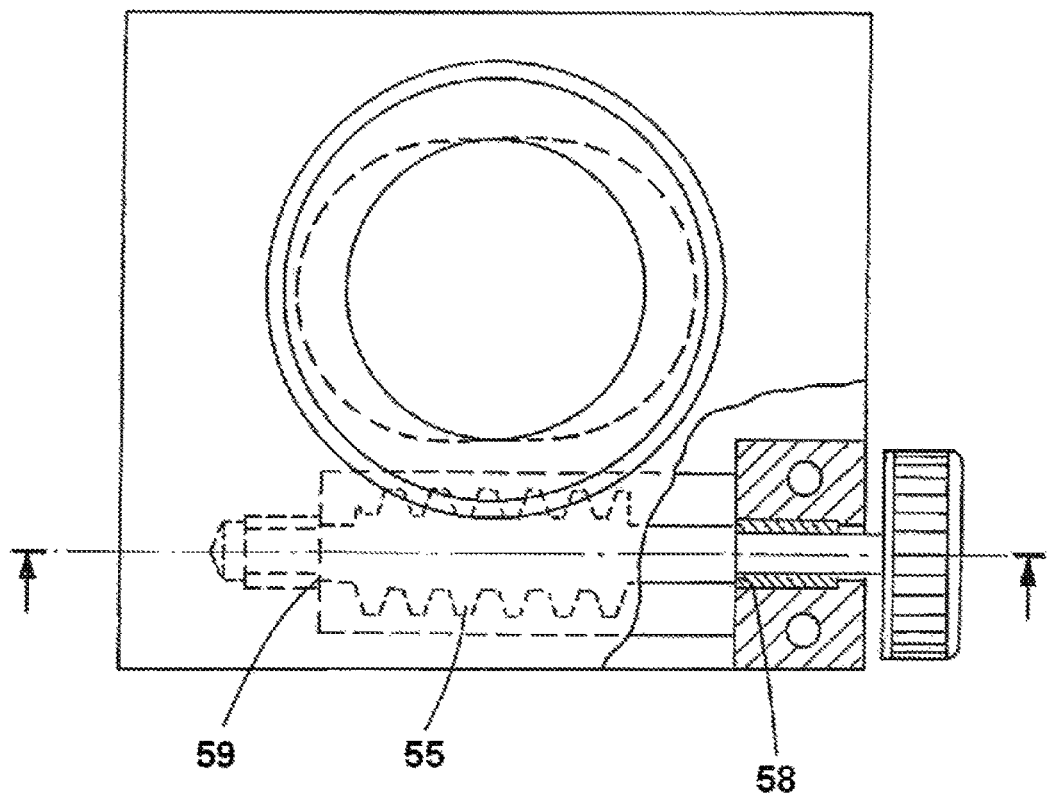

A further embodiment of the invention is illustrated in FIGS. 30 and 31; the bushing 38 inferiorly comprises a seating 54 which receives the regulating means 44. The regulating means comprise: a grub screw 55 which enmeshes with a cogged sector 56, centred on the fulcrum point X. The cogged sector is installed internally of the cap 37 at the seating 54 by known means that are not illustrated.

The grub screw 55, supported in the seating 54 by bushings 57, is axially constrained to the bushing 38 by means of the abutments 58 and 59, included on the non-threaded part of the grub screw, interposed between the bushings 57; thus axial play between the grub screw and the bushing 38 is eliminated.

The grub screw 55 comprises, at the projecting end of the bushing, a knob 60; alternatively a profiled hole can be included, not illustrated, in which a hexagonal key engages.

It is stressed that the grub screw-cogged sector coupling is not reversible.

To regulate the angle of inclination of the steering tube of the front wheel, the cyclist rotates the knob 60 to activate the grub screw 55 in rotation, which, being engaged with the cogged sector 56, determines the oscillation of the bushing 38 with respect to the fulcrum point X and the consequent relative displacement of the bushing with respect to the cap 37; this causes the oscillation of the shaft 6 with respect to the fulcrum X, and therefore the change of the angle of inclination of the steering tube of the front wheel.

In a further embodiment, illustrated in FIGS. 27A-27B-27C, 28A-28B and 29A-29B (which is interchangeable with the preceding embodiment of FIGS. 22A, 22B 22C), the tubular sleeve 23 receives, in the upper end thereof, the lower part of a first plate-shaped element 61 having a slot 62 crossed by the upper part of the shaft 6. The first plate-shaped element 61 comprises, on the upper head, a grooved surface 63 having constantly-pitched grooves, interrupted by the slot 62 which engages with a corresponding grooved surface 64 realised in the lower face of a second plate-shaped element 65 which axially comprises a slot 66, through which the upper part of the shaft 6 freely transits; a seating 67, spherically profiled, is made in the upper face of the element 65.

A bushing 68, the external surface 69 of which is complementary with respect to the surface of the seating 67, axially comprises a through-hole 70 for insertion of the shaft 6. At the annular portion of the upper surface 68A thereof, the bushing 68 restingly receives an overturned cup-shaped element 71 which comprises a seating 72 that receives the upper end of the shaft 6. The bushing 68 comprises a hole 72, at the upper end, through which a screw 73 passes. The screw engages with a threaded hole 74 axially afforded on the upper end of the shaft 6; this enables actuating the axial locking of the overturned cup-shaped element 71, the bushing 68, and the second plate-shaped element 66 with respect to the first plate-shaped element 61.

Figure 27C:
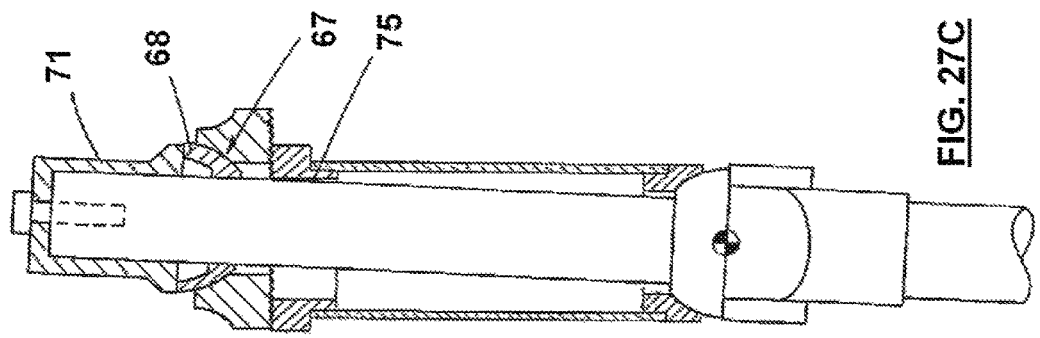
FIGS. 27A, 27B and 27C are partial lateral section views of a further embodiment of the frame of the invention.
Figure 27B:
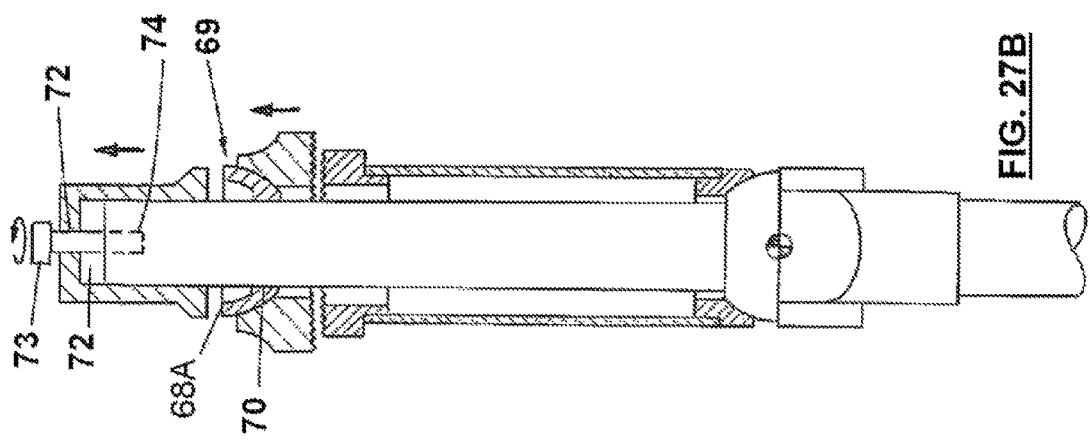
Figure 27A:
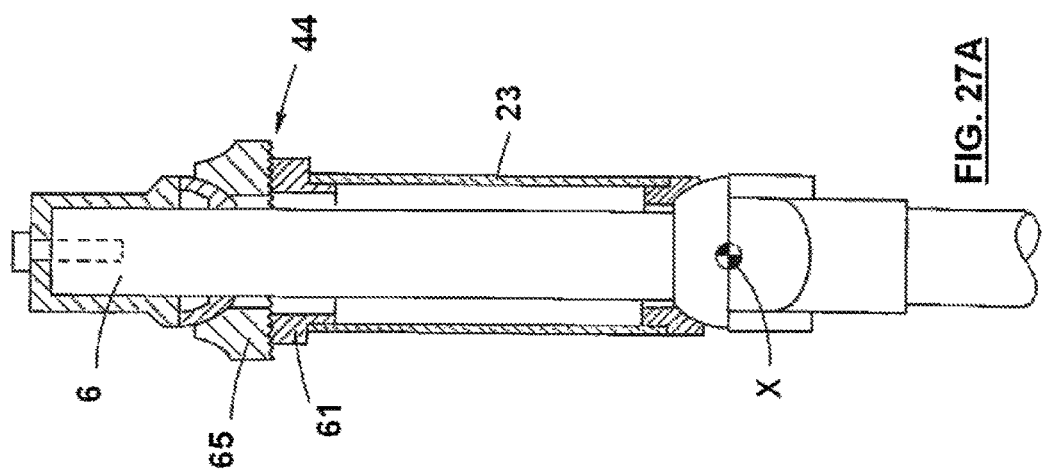
Figure 29A:
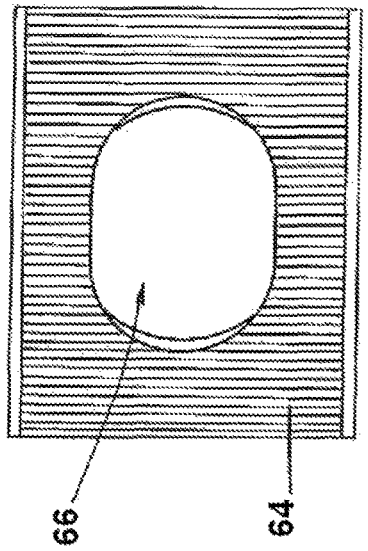
FIGS. 29A and 29B respectively illustrate a plan and lateral view of a second element that is complementary to FIGS. 27A, 27B and 27C.
Figure 29B:
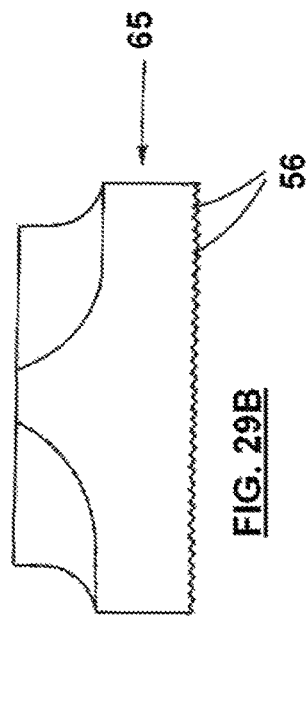
Figure 28A:
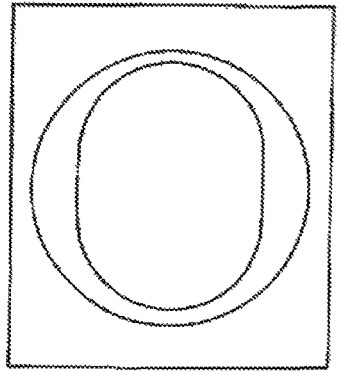
FIGS. 28A, 28B e 28C respectively illustrate a plan and lateral view from the opposite side of a first element that is an integral part of the frame according to the embodiment of FIGS. 27A, 27B and 27C.
Figure 28B:
Figure 28C:
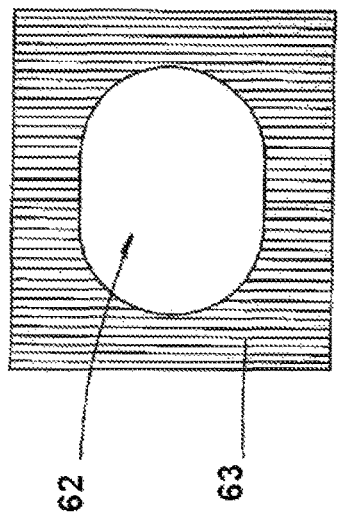

In the illustrated embodiment, when it is necessary to modify the angle of inclination of the steering tube of the front wheel, the user loosens the screw 73 and lifts the overturned cup-shaped element 71 as illustrated in FIG. 27B so as to disengage the grooved surface 64 of the second plate-shaped element 65 from the grooved surface 63 of the first plate-shaped element 61.

The above-described operations enable the user to manually oscillate the shaft 6 about the fulcrum X, enabling varying the angular positioning of the fork with respect to the vertical plane parallel to the advancement direction of the bicycle.

Consequently the user can appropriately position the fork 2 so as to be inclined by a predetermined angle (for example, as indicated in FIG. 27C), with respect to a plane that is perpendicular to the ground.

The angular travel of the fork 2 is limited by the contact of a portion of the surface of the shaft 6 with a portion of the internal surface 64 of the slot 62 of the first plate-shaped element 61.

The operations for blocking the fork in the user's desired position are inverse to those described in the foregoing.

The variable-trim frame according to the variants of FIGS. 21-31 therefore attains the aim of enabling the user to rapidly and easily vary the angle of inclination of the steering tube of the front wheel of the bicycle.

In particular, according to the embodiments illustrated in FIGS. 23-24, 25-26 and 30 and 31 it is possible to vary the angle of inclination of the frame simply by operating the rotation of a special tool, such as a grub screw, or according to the embodiment of the present invention illustrated in FIGS. 27A-27B-27C, 28A-28B-28C and 29A-29B by simply loosening a screw, the raising of an overturned cup-shaped element and the manual oscillation of the steering tube of the steering.

An advantageous aspect of the invention is constituted by the fact that the regulation of the trim of the frame is obtainable with great precision so as to ensure, in all riding conditions, the preferential trim of the two-wheeled vehicle; in particular according to the embodiments of the present invention illustrated in FIGS. 23-24, 25-26, and 30 and 31, the regulation is obtainable continuously within an appropriate range of variability, while the second embodiment illustrated in FIGS. 27A-27B-27C, 28A-28B-28C and 29A-

29B the regulation can be obtained discretely within an appropriate range of variability, with a resolution corresponding to that of the pitch between the grooves of the grooved surface.

Figure 22C:
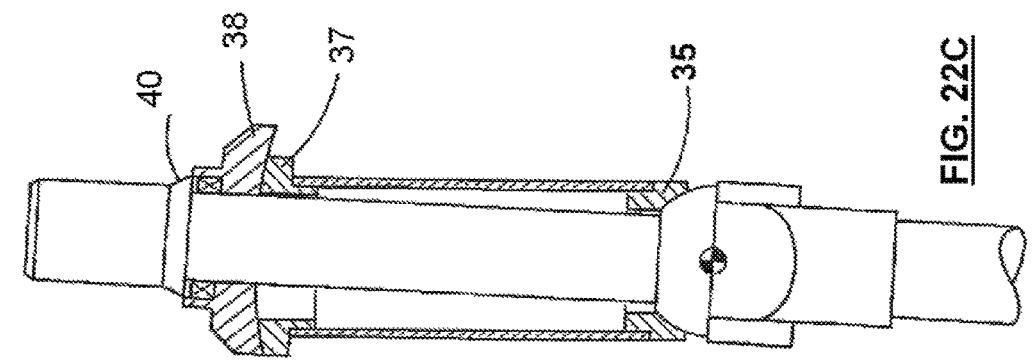
FIGS. 22A, 22B, 22C are respectively a section view along plane XXII-XXII of FIG. 21 of a detail of the fork of the frame according to the above-mentioned variant of the invention, in which the steering tube is regulated according to different angular positions.
Figure 22B:
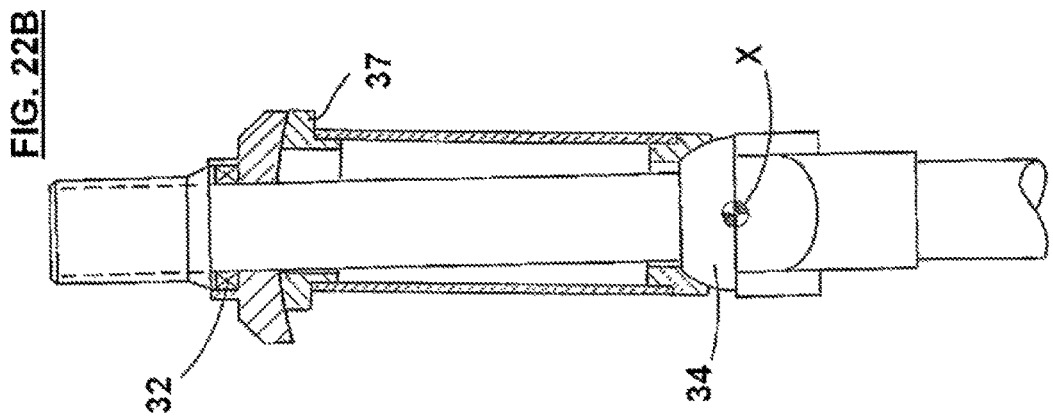
Figure 22A:
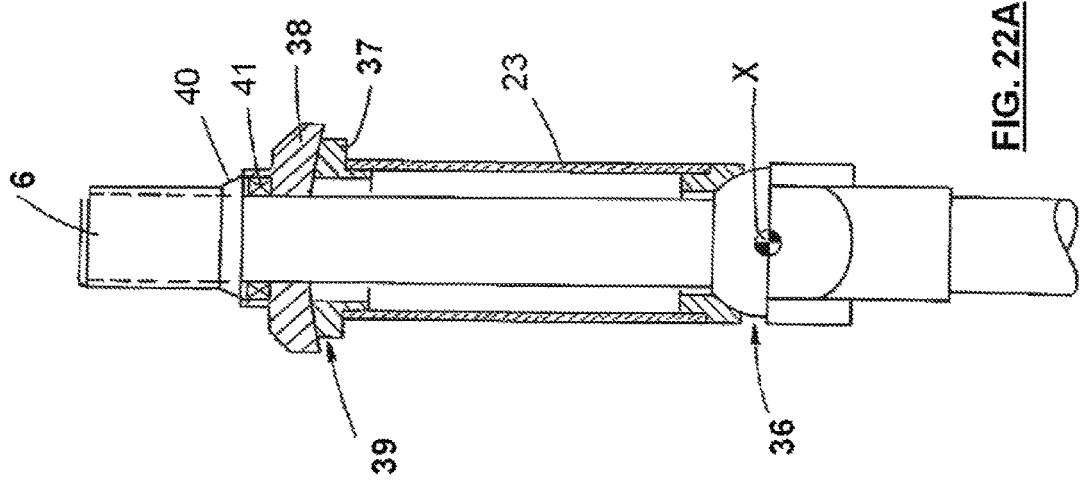

FIG. 32 is alike the solution illustrated in FIGS. 22A, 22B, 22C, relating to a different specification of the fork, conformed with the blades 2A, 2B joined in proximity of the upper end by means of a plate 76, details $G_1$ and $G_2$ have the same technical-functional characteristics of the details as in FIGS. 22A, 22B, 22C.

The detail of the frame illustrated in FIG. 32 can be used in a coupling with any one of the hinge devices for the regulation of the inclination of the axis of the frame of the present invention and illustrated in FIGS. 23-24, 25-26, 30-31.

It is understood that the above has been described by way of example and that any constructional variants are considered to fall within the protective scope of the invention as claimed in the following.

The invention claimed is:

1. A variable-trim frame for two-wheeled vehicles, comprising: a fork able to connect a handlebar to a hub of a front wheel of a vehicle; regulating means able to rotatably couple a lower portion of a shaft of the handlebar with respective portions of blades of the fork and configured to make the fork assume a predetermined position in which it is inclined by a relative angle with respect to a perpendicular plane to a ground surface; blocking means able to stabilize the fork in the predetermined position, wherein the regulating means comprise: a lower plate having, in proximity of the lateral ends thereof, two holes, respectively a left and right hole, crossable by the respective blades, left and right, of the fork; first clamping means able to block, at the left and right holes, the lower plate to the blades; a central hole, located in a central portion of the lower plate, crossed by the lower end of the shaft; a pin, ends of which are fixed to walls delimiting the central hole and positioned horizontally so as to be perpendicular to the axis of the above-mentioned shaft of the steering, able to freely couple with a first transversal through-hole in proximity to the lower end of the shaft and perpendicular to the axis thereof, in order to enable, in consequence of the deactivating of the blocking means, oscillations of the fork in a vertical plane parallel to the advancement direction of the two-wheeled vehicle.

2. A variable-trim frame for two-wheeled vehicles, comprising: a fork able to connect a handlebar to a hub of a front wheel of a vehicle; regulating means able to rotatably couple a lower portion of a shaft of the handlebar with respective portions of blades of the fork and configured to make the fork assume a predetermined position in which it is inclined by a relative angle with respect to a perpendicular plane to a ground surface; blocking means able to stabilize the fork in the predetermined position, the regulating means comprising: a lower plate having, in proximity of the lateral ends thereof, two holes, respectively a left and right hole, crossable by the respective blades, left and right, of the fork; first clamping means able to block, at the left and right holes, the lower plate to the blades; a through-hole, in the central part of the plate, the surface of which extends according to a spherical portion with a growing diameter proceeding in a top-downwards direction; a head at the lower end of the shaft, peripherally delimited by a spherical profiled portion complementary to the spherical portion of the hole, a coupling between the spherical portion and the head defining a spherical joint enabling oscillations of the shaft with respect to the plate.

3. The variable-trim frame of claim 1, the blocking means comprising: an upper plate having, in proximity of the lateral ends thereof, two holes, respectively a left and right hole, crossed by the upper ends of the respective blades, left and right, of the fork; second clamping means able to block, at the left and right holes, the upper plate to the blades; a slot, located at a central portion of the upper plate, freely crossed by a central portion of the shaft and able to at least partly limit the angular travel thereof; upper and lower blocking devices, associated to portions of the shaft, respectively overlying and underlying the upper plate, and able to block the upper plate between them.

4. The variable-trim frame of claim 3, the upper plate comprising, at the lower face thereof, a cogged surface, interrupted by the slot, the cogs of which are perpendicular to the axes of the holes, left and right; further comprising, at the upper face thereof, an undercut which at least partly contacts the border of the slot; with the upper blocking device comprising: a lower block and an upper block hinged to one another according to an axis that is perpendicular to the axis of the shaft; a prominence located inferiorly on the lower block, enabling sliding coupling thereof with the undercut of the upper plate; a first oval through-hole, centrally located in the lower block, crossable by the shaft; a first circular through-hole, centrally located in the upper block, crossable by the shaft; clamping means, externally associated to an upper terminal portion of the shaft, able to axially press, from the top-downwards, the upper blocking device against the upper face of the upper plate.

5. The variable-trim frame of claim 3, the upper blocking device comprising: a lower block and an upper block hinged to one another according to an axis that is perpendicular to the axis of the shaft; an oval through-hole, centrally located in the lower block, crossable by the shaft; a circular through-hole, centrally located in the upper block, crossable by the shaft; clamping means, externally associated to the upper terminal portion of the shaft, able to axially press, from the top-downwards, the upper blocking device against the upper face of the upper plate.

6. The variable-trim frame of claim 3, the upper blocking device comprising: a lower block, associated, by a spherical coupling, to an upper block; a prominence located inferiorly on the lower block, enabling sliding coupling thereof with an undercut of the upper plate; a first oval through-hole, centrally located in the lower block, crossable by the shaft; a first circular through-hole, centrally located in the upper block, crossable by the shaft; clamping means, externally associated to the upper terminal portion of the shaft, able to axially press, from the top-downwards, the upper blocking device against the upper face of the upper plate.

7. The variable-trim frame of claim 3, wherein the lower blocking device comprises: a gripping block and a stabilizing block, positioned inferiorly of the gripping block, hinged to one another according to a perpendicular axis to the axis of the shaft; a cogging, conformed on at least a portion of the upper face of the gripping block, able to couple with a cogged surface fashioned on the upper plate; a second oval through-hole, centrally located in the gripping block, crossable by the shaft; a second circular through-hole conformed centrally by the stabilizing block, crossable by the shaft; abutting means, externally associated to the central portion of the shaft, able to prevent axial movements of the lower blocking device.

8. The variable-trim frame of claim 3, wherein the lower blocking device comprises: a gripping block and a stabilizing block, positioned inferiorly of the gripping block, associable to one another by a spherical coupling; a cogging, conformed on at least a portion of the upper face of the gripping block, able to couple with a cogged surface on the upper plate; an oval through-hole, centrally located in the gripping block, crossable by the shaft; a circular through-hole centrally located in the stabilizing block, crossable by the shaft; abutting means, externally associated to the central portion of the shaft, able to prevent axial movements of the lower blocking device.

9. The variable-trim frame of claim 3, wherein the left and right holes made in the lower plate are coaxial to the respective left and right holes in the upper plate.

10. The variable-trim frame of claim 3, comprising, on the upper surface of the upper plate, a graduated scale able to provide an indication relative to the inclination of the fork with respect to the ground.

11. A frame for a two-wheeled vehicle having a variable trim, comprising: a fork able to connect a handlebar to the hub of the front wheel, having an upper shaft connected to the handlebar, and two parallel blades able to accommodate the hub at the respective lower ends thereof; a tubular sleeve, in which the shaft can be housed, passing axially with a variable inclination; a first spherical joint hinge, arranged at a lower end of the sleeve and enabling the shaft to oscillate in a longitudinal plane and at the same time to rotate about a fulcrum point; regulating means associated to the with an upper end of the tubular sleeve for regulating the angle of inclination of the blade with respect to the sleeve.

12. The frame of claim 11, the regulating means comprising: a second spherical joint hinge, coaxial and kinematically connected to the first spherical joint hinge.

13. The frame of claim 12, wherein the second hinge comprises a spherical joint having a centre of curvature at the fulcrum point of the first spherical joint hinge.

14. The frame of claim 12, wherein the first spherical joint hinge comprises a spherical cap, coaxial to the blade and solidly constrained thereto, couplable to a complementarily-shaped spherical surface of a bushing, coaxial to the lower end of the sleeve and solidly constrained thereto.

15. The frame of claim 12, the second spherical joint hinge comprising a second spherical cap, coaxial to the upper end of the sleeve and solidly constrained thereto, axially exhibiting a hole through which the upper part of the shaft freely passes, couplable to a complementarily-shaped spherical surface of the second bushing, axially constrained to the shaft.

16. The frame of claim 14, wherein the second spherical joint hinge comprises a groove, in the cap, locatable at a further groove in the bushing, the grooves being facing so as to form a housing seating for regulating means.

17. The frame of claim 16, the regulating means comprising a first block fixed to the cap, a second block fixed to the bushing, a threaded pin having opposite threadings and able to engage respective threaded through-holes of the blocks, for determining, in rotation, a reciprocal nearing or distancing of the blocks.

18. The frame of claim 17, wherein the blocks are constrained in the housing seating defined by the grooves by a respective transversal blocking pin.

19. The frame of claim 17, the threaded pin axially exhibiting, at an end thereof, a profiled hole, made accessible by a through-hole afforded laterally in the bushing, the profiled hole being engageable by manoeuvring means for operating a rotation thereof.

20. The frame of claim 17, the threaded pin projecting laterally from the second spherical joint hinge and having, at the free end thereof, a manoeuvring knob.

21. The frame of claim 11, the regulating means for regulating the angle of inclination of the blade with respect to the sleeve comprising: a first plate, a lower part of which is coupled to the sleeve, having a through-hole for enabling free passage of the blade, and an external head whereof includes grooves positioned at a constant pitch; a second plate having on a lower surface thereof constantly-pitched grooves destined to couple with the grooves of the first plate, and having a through-hole for enabling free passage of the shaft; a bushing, spherically conformed so as to couple to a complementarily-shaped spherical surface formed on a surface part of the first plate and having a central hole for enabling passage of the shaft; an overturned cup-shaped element centrally exhibiting a seating for receiving the shaft and subject to axial clamping means of the overturned cup-shaped element, of the bushing, of the second plate with respect to the first plate.

22. The frame of claim 15, wherein the regulating means comprise: a cogged sector installed and fixed to the cap and centred with respect to the fulcrum point; a grub screw insertable and fixable in a seating fashioned inferiorly on the bushing and destined to engage with the cogged sector; activating means for rotatingly determining a relative displacement of the bushing with respect to the cap.

* * * * *